United States Patent
Chen et al.

(10) Patent No.: US 12,294,306 B2
(45) Date of Patent: May 6, 2025

(54) CONTROLLER OF SWITCHING POWER SUPPLY HAVING A FREQUENCY-JITTERING CONTROL CIRCUIT AND CONTROL METHOD THEREOF

(71) Applicant: Silergy Semiconductor Technology (Hangzhou) LTD, Hangzhou (CN)

(72) Inventors: Zhan Chen, Hangzhou (CN); Jian Deng, Hangzhou (CN); Xiaoru Xu, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 254 days.

(21) Appl. No.: 17/585,709

(22) Filed: Jan. 27, 2022

(65) Prior Publication Data

US 2022/0255438 A1 Aug. 11, 2022

(30) Foreign Application Priority Data

Feb. 5, 2021 (CN) .......................... 202110159783.8

(51) Int. Cl.
*H02M 3/335* (2006.01)
*H02M 1/00* (2007.01)
*H02M 1/44* (2007.01)

(52) U.S. Cl.
CPC ..... *H02M 3/33507* (2013.01); *H02M 1/0025* (2021.05); *H02M 1/44* (2013.01)

(58) Field of Classification Search
CPC .............................. H02M 1/44; H02M 1/0025
See application file for complete search history.

(56) References Cited

U.S. PATENT DOCUMENTS

| | | | |
|---|---|---|---|
| 7,227,277 B2 | 6/2007 | Chapman et al. | |
| 7,256,568 B2 | 8/2007 | Lam et al. | |
| 8,049,571 B2 * | 11/2011 | Yeh ........................ | H03K 3/012 |
| | | | 331/111 |
| 8,310,846 B2 | 11/2012 | Piazzesi | |
| 8,853,888 B2 | 10/2014 | Khaligh | |
| 9,130,460 B2 | 9/2015 | Sun et al. | |
| 9,257,916 B2 | 2/2016 | Cheng et al. | |
| 9,331,567 B2 | 5/2016 | Lin et al. | |
| 9,543,822 B2 | 1/2017 | Hang et al. | |
| 9,559,591 B2 | 1/2017 | Hang et al. | |
| 9,966,831 B2 | 5/2018 | Zhang et al. | |
| 10,804,806 B1 * | 10/2020 | Finkel ............... | H02M 3/33523 |

(Continued)

FOREIGN PATENT DOCUMENTS

CN 102594135 A * 7/2012

*Primary Examiner* — Gustavo A Rosario-Benitez (57) ABSTRACT

A controller of a switching power supply can include: a frequency-jittering control circuit configured to generate a frequency-jittering signal adaptively; a comparator having two input terminals for respectively receiving an inductor current sampling signal and a feedback control signal, and being configured to compare the signals of the two input terminals to generate a switching control signal, in order to control a power transistor in the switching power supply; and a superimposing circuit configured to superimpose the frequency-jittering signal on one of the two input terminals of the comparator, where a switching frequency of the switching power supply varies within a preset range under different load conditions.

12 Claims, 6 Drawing Sheets

(56) References Cited

U.S. PATENT DOCUMENTS

| | | |
|---|---|---|
| 2007/0052397 A1 | 3/2007 | Thompson et al. |
| 2008/0231115 A1 | 9/2008 | Cho et al. |
| 2008/0258688 A1 | 10/2008 | Hussain et al. |
| 2012/0153729 A1 | 6/2012 | Song et al. |
| 2012/0194227 A1* | 8/2012 | Lin .................. H02M 1/44 |
| | | 327/113 |
| 2013/0063180 A1 | 3/2013 | Sun et al. |
| 2015/0078045 A1 | 3/2015 | Zhang et al. |
| 2016/0070290 A1* | 3/2016 | Liu .................. H03K 7/08 |
| | | 323/315 |
| 2016/0156259 A1* | 6/2016 | Zhang ............ H02M 3/33523 |
| | | 363/21.12 |
| 2016/0211745 A1 | 7/2016 | Hang et al. |
| 2017/0063238 A1 | 3/2017 | Hang et al. |
| 2017/0085185 A1* | 3/2017 | Wang ................ H02M 1/08 |
| 2017/0279279 A1 | 9/2017 | Shimada et al. |
| 2017/0373589 A1* | 12/2017 | Saint-Pierre ........ H02M 1/44 |
| 2018/0074531 A1* | 3/2018 | Pham ............ G01R 31/31709 |
| 2018/0083540 A1* | 3/2018 | Pham ................ H02M 1/08 |
| 2018/0198361 A1 | 7/2018 | Seong et al. |
| 2020/0195132 A1* | 6/2020 | Tsou ............ H02M 3/33515 |

\* cited by examiner

CONTROLLER OF SWITCHING POWER SUPPLY HAVING A FREQUENCY-JITTERING CONTROL CIRCUIT AND CONTROL METHOD THEREOF

RELATED APPLICATIONS

This application claims the benefit of Chinese Patent Application No. 202110159783.8, filed on Feb. 5, 2021, which is incorporated herein by reference in its entirety.

FIELD OF THE INVENTION

The present invention generally relates to the field of power electronics, and more particularly to control circuits and associated switching power supplies.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

A switching power supply usually produces serious electromagnetic interference (EMI) due to fast switching of power transistors in operation. It is a common concern in industry to reduce EMI as required by some standards of the power supply. One approach to reduce EMI of the switching power supply is to add an EMI filter into the circuit. However, this approach can increase the cost and size of the power supply, deteriorate high-frequency performance, and increase power consumption. The frequency jittering control is an effective method for suppressing conducted EMI, and has been widely used in some low-power switching power supplies. This approach changes an operating frequency of the switching power supply periodically or non-periodically in a range, such that harmonic interference energy is dispersed and the EMI standards are met.

However, frequency jittering control in the switching power supply may be based on the principle of changing a system switching frequency of the switching power supply. Although it can suppress conducted EMI, the power transistor may not be turned on at idea moment due to variation of the system switching frequency in some cases. The frequency jittering control may lead to higher conduction loss, lower system efficiency, and higher heat dissipation. Moreover, because the power transistor is turned on and off at a high voltage in this approach, additional electromagnetic radiation may occur, which can result in degradation of EMI. Thus, it is desirable to further improve the frequency jittering control in a switching power supply, in order to reduce conduction loss and suppress electromagnetic radiation of the power transistor.

Figure 1:
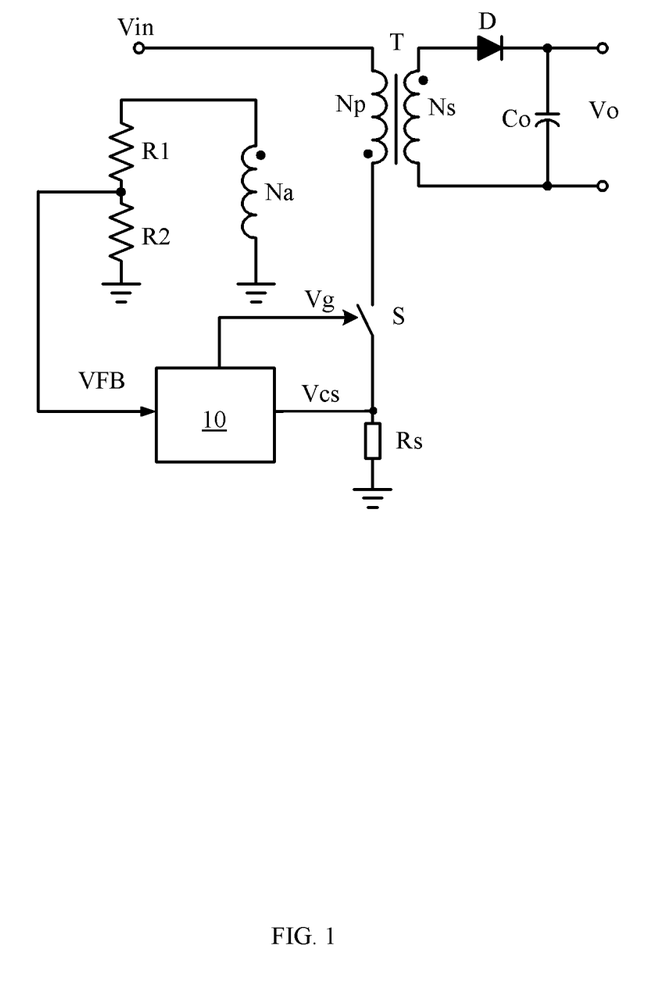
FIG. 1 is a schematic diagram of an example switching power supply.

Referring now to FIG. 1, shown is a schematic diagram of an example switching power supply. In this example, the switching converter is a flyback switching power supply, including transformer T. Transformer T can include primary winding Np, secondary winding Ns, and auxiliary winding Na configured to transfer power energy and feedback a signal. At the primary side, an external AC input signal after rectified and filtered can be configured as input voltage Vin. A first terminal of primary winding Np of transformer T can receive input voltage Vin, and power transistor S and sampling resistor Rs can connect in series between a second terminal of primary winding Np of transformer T and the ground. At the secondary side, a first terminal of secondary winding Ns of transformer T can connect to diode D, capacitor Co can connect in parallel between a cathode of diode D and the ground, and output voltage Vo can be generated at both terminals of capacitor Co.

A first terminal of auxiliary winding Na of transformer T can be configured as a feedback terminal, and a second terminal of auxiliary winding Na can be grounded. Resistors R1 and R2 may form a voltage divider network, and voltage feedback signal VFB representative of output voltage Vo at the secondary side can be obtained from the first terminal of auxiliary winding Na. A voltage feedback circuit can obtain voltage feedback signal VFB from auxiliary winding Na of transformer T. Controller 10 can obtain inductor current sampling signal Vcs representative of a current flowing through primary winding Np from sampling resistor Rs, and obtain voltage feedback signal VFB of the secondary voltage at secondary winding Ns from the voltage feedback circuit. Controller 10 can generate switching control signal Vg according to inductor current sampling signal Vcs and voltage feedback signal VFB, thereby controlling the switching state of power transistor S.

For example, switching control signal Vg can be configured as a pulse-width modulation (PWM) signal with a duty cycle, such that power transistor S can be switched between an on state and an off state. Here, it should be understood that some embodiments may only provide a solution for obtaining inductor current sampling signal Vcs and voltage feedback signal VFB. In other embodiments, other possible methods may be adopted to obtain the sampling or feedback signal in the circuit. When power transistor S is turned on, primary winding Np of transformer T can bear input voltage Vin, and primary inductor current IL rises linearly from zero. When inductor current sampling signal Vcs generated across sampling resistor Rs reaches feedback control signal Vcomp, power transistor S can be turned off. Here, feedback control signal Vcomp may represent a limit value of the primary inductor current at the primary side.

In one embodiment, feedback control signal Vcomp can characterize an error between voltage feedback signal VFB representative of the output voltage at the secondary side and a reference voltage. When power transistor S is turned off, a freewheeling current can flow through secondary diode D, the secondary winding may have a negative voltage Vo, and primary inductor current IL can decrease linearly. In the quasi-resonant mode, power transistor S can be turned on again at a valley of its source-drain voltage. In the quasi-resonant mode, feedback control signal Vcomp can determine a conduction time of power transistor S and the freewheeling current duration of secondary diode D. That is, feedback control signal Vcomp can determine the switching frequency of power transistor S.

Figure 2:
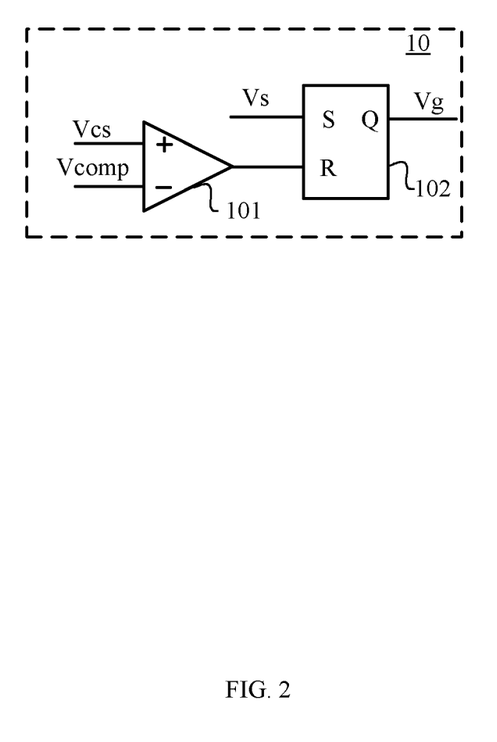
FIG. 2 is a schematic diagram of a first example controller of a switching power supply.

Referring now to FIG. 2, shown is a schematic diagram of a first example controller of a switching power supply. This example controller 10 can include comparator 101 and RS flip-flop 102. A non-inverting input terminal of comparator 101 can receive inductor current sampling signal Vcs, and an inverting input terminal of comparator 101 can receive feedback control signal Vcomp. An output terminal of comparator 101 can provide a turn-off signal. Set terminal S of RS flip-flop 102 can receive a turn-on signal, reset terminal R can receive the turn-off signal, and output terminal Q of RS flip-flop 102 can generate switching control signal Vg. During the conduction period of power transistor S, inductor current sampling signal Vcs can linearly rise. When inductor current sampling signal Vcs reaches feedback control signal Vcomp, the turn-off signal may have a high level, and the signal at output terminal Q of RS flip-flop 102 may have a low level. After power transistor S is turned off, when the turn-on signal has a high level again, the RS flip-flop can provide switching control signal Vg with a high-level, such that power transistor S can be turned on again. Then, the next switching period can begin.

Figure 3:
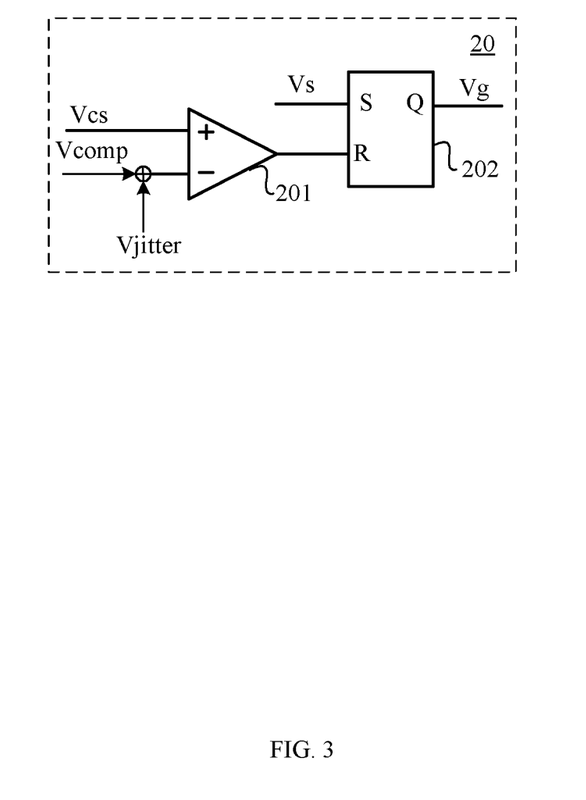
FIG. 3 is a schematic diagram of a second example controller with frequency-jittering control of a switching power supply.

Referring now to FIG. 3, shown is a schematic diagram of a second example controller with frequency-jittering control of a switching power supply. In one example frequency-jittering control, by adding frequency-jittering signal Vjitter to feedback control signal Vcomp to change the amplitude of feedback control signal Vcomp, the switching frequency can be changed, thereby realizing the frequency jittering control. However, the switching power supply can produce electromagnetic interference when operating at a fixed frequency, and the conducted interference can mainly be concentrated in the frequency points of 1, 2, and 3 times switching frequency. When the switching frequency is very fixed, the energy at the 1, 2, and 3 times frequency points can be very concentrated. In the conduction test, the spikes at the above-mentioned frequency points may be very high, and a stronger filter circuit must be adopted in order to meet the electromagnetic compatibility requirements.

In one frequency-jittering control method, the amplitude of frequency jittering signal Vjitter is fixed at, e.g., 30%-100% load. In this way, this method has two disadvantages: one is at 30%-50% load, the frequency-jittering control can cause larger ripples; and second, when at 25% and 10% loads no frequency jittering control may be involved, which can lead to conduction interference that cannot be optimized. In another frequency-jittering control approach, the amplitude of frequency jittering signal Vjitter can be determined according to the load condition. That is, the amplitude of the frequency-jittering signal can be relatively large under heavy load, and the amplitude of the frequency jittering signal relatively small under light load. This method also has two disadvantages: one is that a small amplitude of the frequency jittering signal at light load will cause poor frequency jittering effect; and second, at 25% and 10% loads, no frequency jittering may be involved, which can lead to conduction interference that cannot be optimized. In order to solve the above-mentioned problems, particular embodiments utilize a new frequency jittering control approach. When the load is between a first threshold to a full load (e.g., 30%-100% heavy load), the controller can generate the frequency jittering signal adaptively, such that under different load conditions, the switching frequency can vary with a preset range; that is, the jittering range of the switching frequency is fixed.

Figure 4:
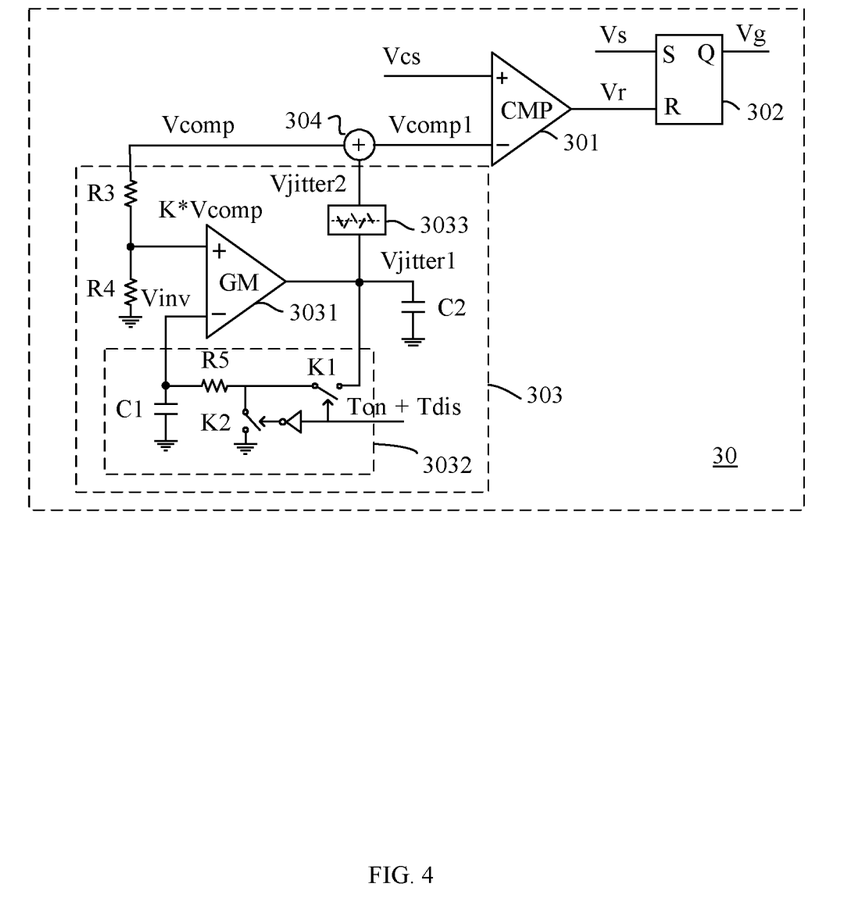
FIG. 4 is a schematic diagram of a first example controller for a switching power supply, in accordance with embodiments of the present invention.

Referring now to FIG. 4, shown is a schematic diagram of a first example controller for a switching power supply, in accordance with embodiments of the present invention. This example controller 30 can include comparator 301, RS flip-flop 302, frequency jittering control circuit 303, and superimposing circuit 304. Frequency jittering control circuit 303 can generate frequency jittering signal Vjitter2 adaptively, such that the jittering range of switching frequency f of the power transistor in the switching power supply can be fixed under different load conditions; that is, the switching frequency can vary with the preset range. Superimposing circuit 304 can superimpose feedback control signal Vcomp on frequency jittering signal Vjitter2, in order to generate superimposed signal Vcomp1.

Comparator 301 can compare superimposed signal Vcomp1 against inductor current sampling signal Vcs, and may generate the turn-off signal for controlling the power transistor in the switching power supply to be turned off when inductor current sampling signal Vcs rises to superimposed signal Vcomp1. A non-inverting input terminal of comparator 301 can receive inductor current sampling signal Vcs, an inverting input terminal of comparator 301 can receive superimposed signal Vcomp1, and an output terminal of comparator 301 can generate turn-off signal Vr. Set terminal S of RS flip-flop 302 can receive turn-on signal Vs. reset terminal R of RS flip-flop 302 can receive turn-off signal Vr, and output terminal Q of RS flip-flop 302 can generate switching control signal Vg. Frequency jittering control circuit 303 can control the amplitude of frequency jittering signal Vjitter2 to be proportional to switching period T of power transistor S, and to be inverse proportional to the sum of conduction time Ton of power transistor S and demagnetization time Tdis of the inductor, such that the jittering range of the switching frequency can be fixed under different load conditions.

That is, the amplitude of frequency jitter signal Vjitter2 can be proportional to the ratio of switching period T to the sum of conduction time Ton and demagnetization time Tdis of the inductor, such that under different load conditions, the jittering range of the switching frequency can be unchanged. Further, the amplitude of frequency-jittering signal Vjitter2 may also be proportional to feedback control signal Vcomp. In this embodiment, frequency jittering signal Vjitter2 can be configured as a triangular wave signal, and the amplitude of frequency jittering signal Vjitter2 refers to a peak-to-peak value of the triangular wave signal. In other embodiments, the frequency-jittering signal Vjitter2 may also be a sine wave signal, as long as the amplitude of its peak-to-peak value meets the foregoing relationship.

Figure 5:
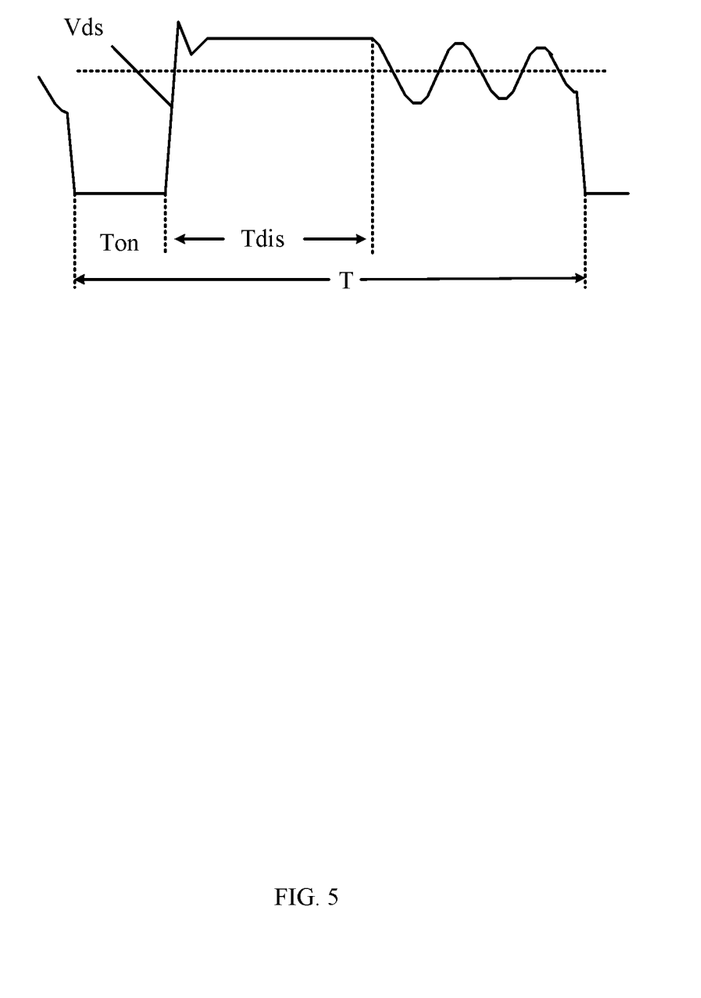
FIG. 5 is a waveform diagram of example operation of the switching power supply, in accordance with embodiments of the present invention.

Referring now to FIG. 5, shown is a waveform diagram of example operation of the switching power supply, in accordance with embodiments of the present invention one example waveform of drain-source voltage Vds of power transistor S of the flyback power supply is shown. During conduction time Ton, power transistor S can be turned on, and drain-source voltage Vds may be close to zero, and during demagnetization time Tdis, the voltage of secondary winding Ns of transformer T can be clamped to output voltage Vo, and the energy stored in transformer T may be released to the output terminal of the flyback power supply through diode D. After demagnetization time Tdis is over, diode D may not conduct in the reverse direction, thus secondary winding Ns may not be clamped, and transformer T can resonate with the parasitic capacitor, and the next switching period may begin at an appropriate moment. In addition, at the end of demagnetization time Tdis, drain-source voltage Vds being less than a certain threshold can be detected easily, such that demagnetization time Tdis can be obtained.

Frequency jittering control circuit 303 can include error amplifier 3031, inverted input signal generating circuit 3032, and frequency jittering signal generating circuit 3033. Error amplifier 3031 can generate intermediate signal Vjitter1 representative of the amplitude of frequency jitter signal Vjitter2. A non-inverting input terminal of error amplifier 3031 can receive feedback control signal Vcomp, and an inverting input terminal of error amplifier 3031 can receive an inverting input signal proportional to intermediate signal Vjitter1. Here, it should be understood that the non-inverting input terminal of error amplifier 3031 can receive the product of feedback control signal Vcomp and proportional coefficient k obtained after voltage division. For example, proportional coefficient k is R4/(R3+R4), and the signal received by the non-inverting input terminal of error amplifier 3031 is Vcomp*k.

Inverting input signal generating circuit 3032 can multiply intermediate signal Vjitter1 with the adaptive proportional coefficient to obtain inverting input signal Vinv. An inverting input terminal of error amplifier 3031 can receive inverting input signal Vinv. Here, proportional coefficient k is the ratio of the sum of conduction time Ton of power transistor S and demagnetization time Tdis of the inductor to switching period T. Inverting input signal generating circuit 3032 can include a switch circuit and a filter circuit, as shown in the example of FIG. 4. The switch circuit can transmit intermediate signal Vjitter1 to the filter circuit during time period T1 of power transistor S. The filter circuit may not be enabled during time period T2. Here, time period T2 is the time period other than time period T1 in switching period T. Time period T1 can be the sum of conduction time Ton of power transistor S and demagnetization time Tdis of the inductor, and the sum of time period T1 and time period T2 is switching period T of power transistor S. Inverting input signal Vinv can be generated at the output terminal of the filter circuit.

The switch circuit can include switches K1 and K2. A first terminal of switch K1 can receive intermediate signal Vjitter1, a second terminal of switch K1 can connect to the input terminal of the filter circuit, the first terminal of switch K2 can connect to the input terminal of the filter circuit, the second terminal of switch K2 can connect to the ground. In this example, switches K1 and K2 may be complementarily turned on, and switch K1 can be turned on during time period T1, and switch K2 can be turned on during time period T2. The filter circuit can be an RC filter including resistor R5 and capacitor C1. The first terminal of resistor R5 can be the input terminal of the filter circuit and can connect to switch K1, the second terminal of resistor R5 can connect to capacitor C1, and the other terminal of capacitor C1 can connect to the reference ground. Signal Vinv can be generated at the common node of resistor R5 and capacitor C1.

It is should be understood that the filter voltage may alternatively be implemented by filters of other structures. The frequency jittering signal generating circuit 3033 can generate a triangular wave signal with a peak-to-peak value of intermediate signal Vjitter1 as frequency jitter signal Vjitter2 according to intermediate signal Vjitter1. In one embodiment, the value of frequency jittering signal Vjitter2 may vary between −½ Vjitter1~½ Vjitter1. In other embodiments, the value of frequency jittering signal Vjitter2 can also change between 0~+Vjitter1 or 0~−Vjitter1. In other embodiments, the frequency jitter signal Vjitter2 may also be a sine wave signal, and is not necessarily limited to the triangular wave signal shown.

This embodiment provides a frequency jittering method for adjusting the switching frequency by changing the conduction time of the power transistor. Since frequency jittering signal Vjitter2 is superimposed on feedback control signal Vcomp to control conduction time Ton of the power transistor, according to the volt-second balance rule, demagnetization time Tdis can change with the change of conduction time Ton, and switching period T can change accordingly, such that the switching frequency can be changed. The following further analyzes the working principle of frequency jittering control circuit 303 according to FIG. 4.

The jittering range of the switching frequency (period) can be as shown in Formula 1, $\Delta T$ is the jitter range of switching period T, $\Delta Vcomp$ is the jittering amplitude of feedback control signal Vcomp.

$$\Delta T/T = \Delta Vcomp/Vcomp*(Ton+Tdis)/T \quad (1)$$

In FIG. 4, the jittering amplitude of feedback control signal Vcomp can be as below in Formula 2.

$$Vjitter1*(Ton+Tdis)/T = Vcomp*k \quad (2)$$

Formula 2 can be converted to the following Formula 3.

$$Vjitter1 = Vcomp*k*T/(Ton+Tdis) \quad (3)$$

Since intermediate signal Vjitter1 in Formula 3 is $\Delta Vcomp$ in Formula 1, $\Delta Vcomp$ can be replaced by intermediate signal Vjitter1, and Formula 4 can be obtained as shown.

$$\Delta T/T = k \quad (4)$$

Therefore, it can be known that no matter if the load is 30%, 50% or 100%, the jittering amplitude of the frequency jittering signal can be adjusted adaptively based on the ratio T/(Ton+Tdis); that is, the ratio of switching period T to the sum of conduction time Ton and demagnetization time Tdis, such that the jittering amplitude of the frequency jitter signal can be adaptively determined according to the load, and the jittering range of the switching period is constant value k.

The controller of particular embodiments can prevent the effect of the frequency jitter control from being weakened due to the decrease of the switching frequency under heavy load, thereby improving the conducted electromagnetic interference.

Figure 6:
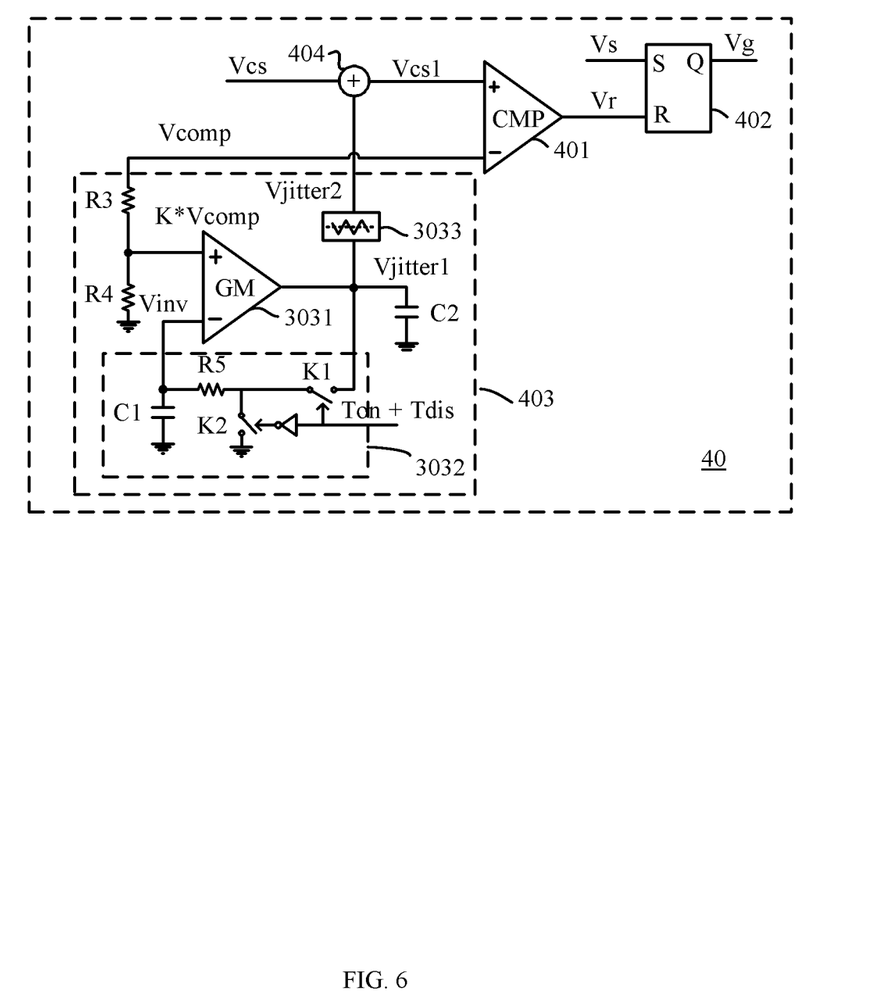
FIG. 6 is a schematic diagram of a second example controller of a switching power supply, in accordance with embodiments of the present invention.

Referring now to FIG. 6, shown is a schematic diagram of a second example controller of a switching power supply, in accordance with embodiments of the present invention. This switching power supply controller 40 can include comparator 401, RS flip-flop 402, frequency jittering control circuit 403, and superimposing circuit 404. The structure and operating principle of RS flip-flop 402 and frequency jittering control circuit 403 can respectively be the same as those of RS flip-flop 302 and frequency jittering control circuit 303 in the above embodiment. The difference between this embodiment and the above embodiment is that superimposing circuit 404 can be configured to superimpose inductor current sampling signal Ves and frequency jittering signal Vjitter2 to generate superimposed signal Vcs1. Further, comparator 401 can compare superimposed signal Vcs1 against feedback control signal Vcomp, and when superimposed signal Ves1 rises to feedback control signal Vcomp, the switching control signal can be generated to control power transistor Sto be turned off.

This example controller 40 can provide a frequency jittering method for changing the switching frequency by adjusting the conduction time of the power transistor in the switching power supply. In this example, conduction time Ton of the power transistor can be adjusted by superimposing frequency jittering signal Vjitter2 on inductor current sampling signal Vcs. Based on the volt-second balance rule, demagnetization time Tdis can change with the change of conduction time Ton, such that switching period T can be adjusted accordingly. Further, the jitter amplitude of the frequency jittering signal can be adaptively adjusted according to the ratio T/(Ton+Tdis), that is, the ratio of switching period T of power transistor S to the sum of conduction time Ton and demagnetization time Tdis of the inductor, such that the jitter amplitude of the frequency jitter signal can be adaptively determined according to the load, and the jittering range of the switching period is constant value k. The controller of particular embodiments may prevent the effect of the frequency jitter control from being weakened due to the decrease of the switching frequency under heavy load, thereby improving the conducted electromagnetic interference. Those skilled in the art will recognize that there are different circuit variations within the scope of the present invention. The circuit components shown in the embodiments may be placed in different arrangements or orders, but still fall within the scope of the present invention and provide the functions described by the circuits originally arranged or ordered in the described embodiments.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A controller of a switching power supply, the controller comprising:
    a) a frequency-jittering control circuit configured to generate a frequency-jittering signal adaptively based on a switching period of a power transistor in the switching power supply, and a first period that is a sum of a conduction time of the power transistor and a demagnetization time of an inductor, wherein the switching period comprises the first period and a second period;
    b) a comparator having two input terminals for respectively receiving an inductor current sampling signal and a feedback control signal, and being configured to compare the signals of the two input terminals to generate a switching control signal, in order to control the power transistor;
    c) a superimposing circuit configured to superimpose the frequency-jittering signal on one of the two input terminals of the comparator, wherein a switching frequency of the switching power supply varies within a preset range under different load conditions;
    d) wherein the frequency-jittering control circuit comprises an error amplifier having a non-inverting input terminal for receiving the feedback control signal, and an inverting input terminal for receiving an inverting input signal proportional to an Intermediate signal, and being configured to generate the intermediate signal representative of an amplitude of the frequency-littering signal; and
    e) wherein the frequency-jittering control circuit comprises an inverting input signal generating circuit configured to multiply the intermediate signal with a proportional coefficient to generate the inverting input signal, wherein the proportional coefficient is a ratio of the switching period of the power transistor to the sum of the conduction time of the power transistor and the demagnetization time of the inductor.

2. The controller according to claim 1, wherein an amplitude of the frequency-jittering signal is proportional to the switching period of the power transistor, and inversely proportional to the sum of the conduction time of the power transistor and the demagnetization time of the inductor, such that under the different load conditions the switching frequency of the switching power supply varies within the preset range.

3. The controller according to claim 1, wherein an amplitude of the frequency-jittering signal is proportional to a ratio of the switching period of the power transistor to the sum of the conduction time of the power transistor and the demagnetization time of the inductor, such that under the different load conditions the switching frequency of the switching power supply varies within the preset range.

4. The controller according to claim 1, wherein an amplitude of the frequency-Jittering signal is proportional to the feedback control signal.

5. The controller according to claim 1, wherein the frequency-jittering signal is one of a triangular wave and a sinusoidal wave.

6. The controller according to claim 1, wherein when a load is between a first threshold value and a full load, the frequency-jittering signal is generated adaptively, such that the switching frequency of the switching power supply varies within the preset range.

7. The controller according to claim 1, wherein the frequency-jittering control circuit further comprises a frequency-jittering signal generating circuit configured to generate the frequency-jittering signal based on the intermediate signal, wherein a peak-to-peak value of the frequency-jittering signal is an amplitude of the intermediate signal.

8. The controller according to claim 1, wherein the inverting input signal generating circuit comprises:
    a) a switch circuit is configured to transmit the intermediate signal to a filter circuit during the first period of the switching period of the power transistor; and b) wherein the filter circuit is grounded during the second period of the switching period, and the second period is other time periods except the first time period in the switching period.

9. The controller according to claim 8, wherein the switch circuit comprises:
   a) a first switch having a first terminal for receiving the intermediate signal, and a second terminal coupled to an input terminal of the filter circuit;
   b a second switch having a first terminal coupled to the input terminal of the filter circuit, and a second terminal coupled to a ground reference; and
   c) wherein the first switch and the second switch are complementarily turned on, and the first switch is turned on during the first period, and the second switch is turned on during the second period.

10. A method of controlling a switching power supply, the method comprising:
   a) generating a frequency-jittering signal adaptively based on a switching period of a power transistor in the switching power supply, and a first period that is a sum of a conduction time of the power transistor and a demagnetization time of an inductor, wherein the switching period comprises the first period and a second period;
   b) superimposing the frequency-jittering signal on a feedback control signal or an inductor current sampling signal to generate a superimposed signal;
   c) generating a switching control signal by comparing the superimposed signal against the inductor current sampling signal or the feedback control signal, in order to control the power transistor, wherein a switching frequency of the switching power supply varies within a preset range under the different load conditions;
   d) generating, by an error amplifier, an intermediate signal representative of an amplitude of the frequency-littering signal, the error amplifier having a non-inverting input terminal for receiving the feedback control signal, and an inverting input terminal for receiving an inverting input signal proportional to the intermediate signal; and
   e) generating the inverting input signal by an inverting input signal generating circuit that multiplies the intermediate signal with a proportional coefficient, wherein the proportional coefficient is a ratio of the switching period of the power transistor to the sum of the conduction time of the power transistor and the de magnetization time of the inductor.

11. The method according to claim 10, wherein an amplitude of the frequency-jittering signal is proportional to the switching period of the power transistor, and inversely proportional to the sum of the conduction time of the power transistor and the demagnetization time of the inductor, such that under the different load conditions the switching frequency of the switching power supply varies within the preset range.

12. The method according to claim 10, wherein an amplitude of the frequency-Jittering signal is proportional to the feedback control signal.

* * * * *